Aug. 23, 1927.
F. P. JONES
1,639,735
ADJUSTABLE BEAM HANGER
Filed Dec. 11, 1926
Fig. 1.
Fig. 2.
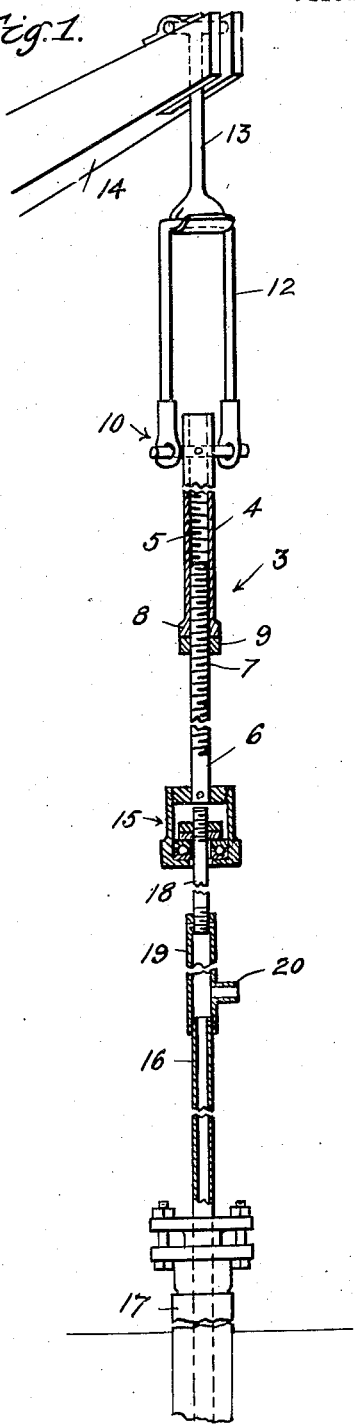
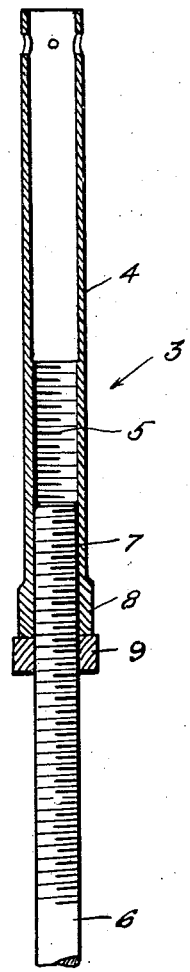
INVENTOR.
Floyd P. Jones
BY
Robt. D. Pearson
ATTORNEY.

Patented Aug. 23, 1927.

1,639,735

UNITED STATES PATENT OFFICE.

FLOYD P. JONES, OF TORRANCE, CALIFORNIA.

ADJUSTABLE BEAM HANGER.

Application filed December 11, 1926. Serial No. 154,184.

This invention relates to adjustable beam hangers designed to be used in oil wells, and especially adapted for the purpose of attaining an efficient adjustment between the standing valve in the bottom of the pump barrel, during a pumping operation, when the pump parts have been set at predetermined locations at the bottom of the well.

The main object of the invention is to provide a simple and efficient means for making the above mentioned adjustments while the pump is in operation and whereby these adjustments may be made conveniently and easily by one operator, thus avoiding the necessity of stopping the pumping operation while making the desired adjustments as well as reducing to a minimum the labor required for this purpose.

Other objects of the invention will be more fully set forth in the following description and illustrated in the accompanying drawings, in which:

Figure 1 represents the device, partly in vertical section, as it would appear when in use.

Figure 2 is an enlarged vertical section through the device.

In carrying out the invention the adjusting mechanism associated with the beam hanger is represented as 3. This mechanism comprises a female member 4 formed of a piece of tubing which is internally threaded as at 5; and a rod 6 which is externally threaded at one of its ends as at 7 and adapted to engage with the threads in the member 3. The member 3 is provided with a nut or flat portion 8 and the rod 6 is provided with a jamb nut 9 which engages its threads.

The top of the member 3 is secured at 10 to the lower end of the usual clevis 12 which in turn engages with the usual beam hanger hook 13 which depends from the walking beam 14.

The lower end of the rod 6 is provided with a ball thrust bearing 15 which forms a swivel joint between the beam hanger and the valve rod 16 which depends into the well and which is to be adjusted vertically for the purposes set forth.

The valve rod 16 passes downwardly, in the usual manner, into the pump casing 17 to an approximate depth and then finer and more efficient adjustments may be made by the use of the adjusting device.

The rod 16 is coupled to the thrust bearing 15 by means of the rod 18 and the sleeve 19 into which is also formed the oil outlet nipple 20.

By the employment of the above described mechanism it will be obvious that in order to perform an adjustment, it will be only necessary for the operator, with the use of a wrench, to loosen the jamb nut 9 and then turn on the rod 6 or the thrust bearing 15, a portion of which is secured to said rod, until the desired adjustment is made, and then to re-set the jamb nut 9.

Having thus described my invention what I claim is:

An oil well rigging having in combination a walking beam; a hook pivoted on said walking beam; a clevis engaging with said hook; an internally threaded sleeve pivoted on said clevis; an externally threaded rod threaded into said sleeve; a thrust bearing secured to said threaded rod and a valve rod depending from said thrust bearing and cooperating therewith.

In testimony whereof I hereunto affix my signature.

FLOYD P. JONES.